UNITED STATES PATENT OFFICE.

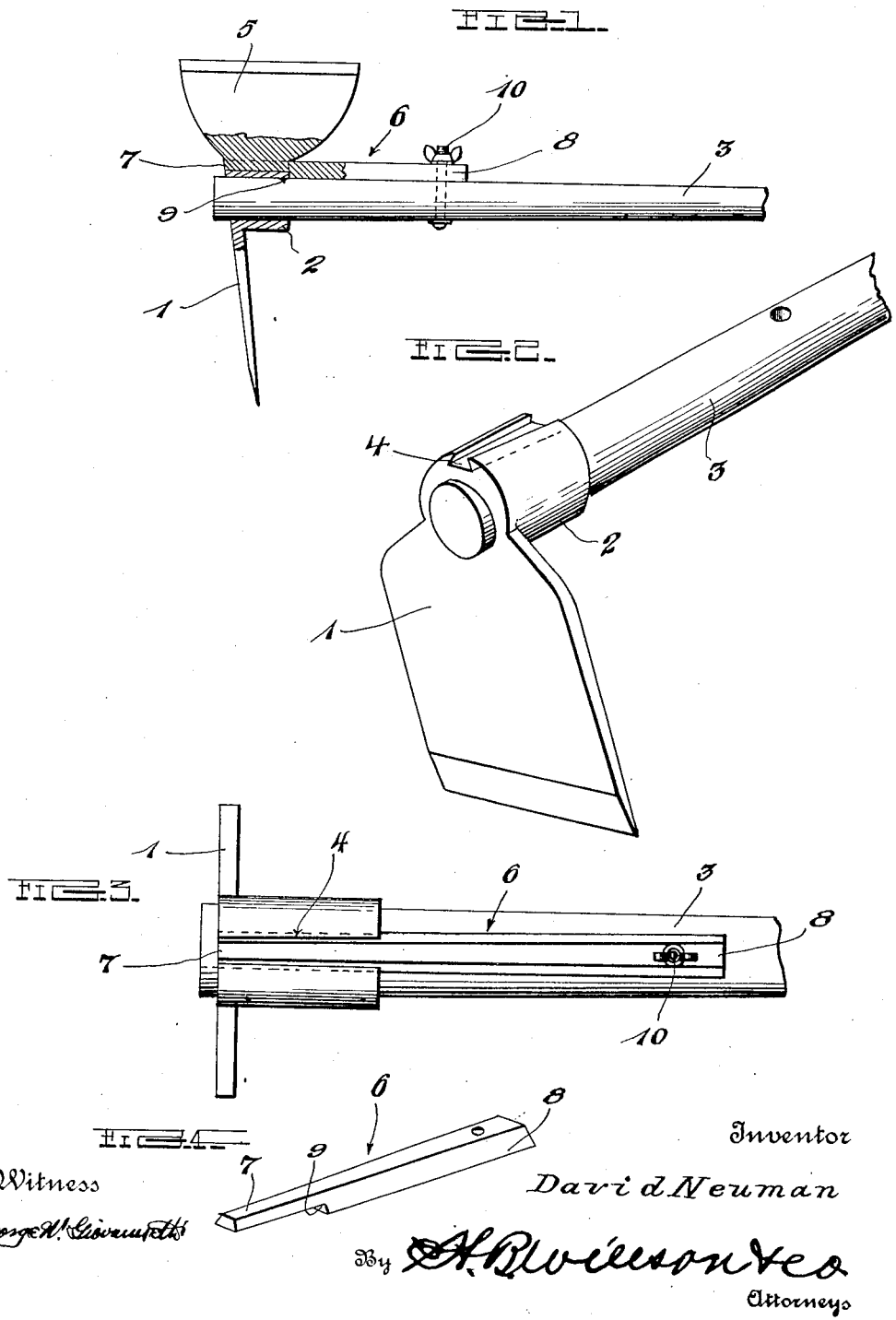

DAVID NEUMAN, OF ALBANY, GEORGIA.

HOE WITH KNIFE ATTACHMENT.

1,328,537.  Specification of Letters Patent.  Patented Jan. 20, 1920.

Application filed October 2, 1919. Serial No. 327,853.

*To all whom it may concern:*

Be it known that I, DAVID NEUMAN, a citizen of the United States, residing at Albany, in the county of Dougherty and State of Georgia, have invented certain new and useful Improvements in Hoes with Knife Attachments; and I do declare the following to be a full, clear, and exact description of the invention, such as will enable others skilled in the art to which it appertains to make and use the same.

This invention relates to improvements in hoes and garden implements and more particularly to means for retaining tools on their handles.

The principal object is to improve on my Patent No. 1,284,752, granted November 12, 1918, said improvement including the formation of a back for an additional cutting blade for a garden implement particularly a field hoe in such a manner that it will positively prevent rearward movement of the ordinary tool on the handle, will relieve strain on bolt connecting the back and handle and is of such shape as to prevent it being easily broken.

With the above and other objects in view, the invention consists of certain novel features of construction and the combination of parts as will be more fully described and claimed.

I attain these objects by constructing the parts as clearly illustrated in the accompanying drawings, in which—

Figure 1 is a side elevation of a hoe or an implement constructed in accordance with my invention, parts being shown in section;

Fig. 2 is a perspective view showing the hoe eye and tapered groove in detail;

Fig. 3 is a top plan view thereof; and

Fig. 4, a detail perspective view of the tapered back strip of the additional tool.

The hoe is shown comprising a blade 1 having an eye 2 which is provided with rearwardly tapered handle 3. The eye 2 is provided in its upper outer face with a forwardly tapered dovetail groove 4 as clearly shown in Fig. 2.

A second tool, illustrated as a cutting blade 5 is provided with a back 6 which is materially longer than the blade and may be formed integral with or separate from said blade. The back 6 is tapered forwardly from its extreme rear end and has its forward portion 7 received in the groove, the remaining portion or shank 8 in the rear of that received in the groove, being thicker and of a uniform thickness throughout. This construction provides a shoulder 9 which abuts the rear end of the eye 2 and in addition fills in the space which, in my other Patent No. 1,284,752, was not filled and rendered the back 6 easily breakable from a very light blow.

The back 6 is secured to the handle 3 in any suitable manner, preferably by a bolt 10 which is passed through alined bolt holes.

It will be seen that in using this tool or hoe as well as others of this general type, there is a tendency for the hoe or head and its eye 2 to slide rearwardly on the handle when it is raised up for a stroke to drive it into the ground. The combined actions of the bolt, shoulder and tapered groove absolutely prevent this movement and save the operator from possible injury.

I claim:—

A garden implement comprising a hoe or like tool having an eye formed with a rearwardly tapered handle opening, a handle received in said opening, said eye having a forwardly tapered dovetail groove in its upper outer face, a second tool having a forwardly tapered dovetail back received in said groove and having a rearwardly extending shank thicker than the depth of said groove, the front end of said thicker portion forming a shoulder abutting the rear end of said eye to prevent rearward movement of the hoe on its handle.

In testimony whereof I have hereunto set my hand.

DAVID NEUMAN.